(12) United States Patent
Kirsch et al.

(10) Patent No.: US 7,054,917 B1
(45) Date of Patent: May 30, 2006

(54) METHOD FOR ACCELERATING DELIVERY OF CONTENT IN A COMPUTER NETWORK

(75) Inventors: Steven T. Kirsch, Los Altos Hills, CA (US); Reuben R. Beckmann, Danville, CA (US); Peter K. Lee, Palo Alto, CA (US)

(73) Assignee: Propel Software Corporation, San Jose, CA (US)

( * ) Notice: Subject to any disclaimer, the term of this patent is extended or adjusted under 35 U.S.C. 154(b) by 819 days.

(21) Appl. No.: 10/214,965

(22) Filed: Aug. 7, 2002

(51) Int. Cl.
*G06F 15/16* (2006.01)

(52) U.S. Cl. ............... 709/217; 709/203; 709/219; 707/3; 707/6

(58) Field of Classification Search ........... 709/217, 709/218–219, 203, 223–226, 213; 707/3, 707/6
See application file for complete search history.

(56) References Cited

U.S. PATENT DOCUMENTS

| | | | | |
|---|---|---|---|---|
| 5,740,549 | A | 4/1998 | Reilly et al. | 705/14 |
| 6,119,153 | A * | 9/2000 | Dujari et al. | 709/218 |
| 6,185,586 | B1 | 2/2001 | Judson | 707/513 |
| 6,298,373 | B1 * | 10/2001 | Burns et al. | 709/203 |
| 6,314,451 | B1 | 11/2001 | Landsman et al. | 709/203 |
| 6,351,767 | B1 * | 2/2002 | Batchelder et al. | 709/219 |
| 6,542,967 | B1 * | 4/2003 | Major | 711/113 |
| 6,625,624 | B1 * | 9/2003 | Chen et al. | 707/10 |
| 6,647,421 | B1 * | 11/2003 | Logue et al. | 709/213 |
| 6,654,741 | B1 * | 11/2003 | Cohen et al. | 707/6 |
| 6,766,422 | B1 * | 7/2004 | Beyda | 711/134 |
| 2001/0034814 | A1 * | 10/2001 | Rosenzweig | 709/203 |

* cited by examiner

*Primary Examiner*—Philip B. Tran
(74) *Attorney, Agent, or Firm*—Schneck & Schneck; Thomas Schneck; Nissa M. Strottman

(57) ABSTRACT

A method of reducing network congestion and service latency associated with downloading Web pages containing third party advertisements. In one embodiment, pattern recognition algorithms are employed to determine whether a request for a URL may be satisfied by the content associated with a URL which is contained in the client's cache; if there is a pattern match, the cached contents associated with the URL are delivered to the browser to satisfy the request. In another embodiment, images associated with HTML snippet ads are requested and cached by client software before they are requested by the browser downloading the Web page where the images will be displayed. In a third embodiment, latency is reduced by "time shifting," wherein a cached ad is displayed while client software requests and caches the ad originally requested ad, which will be shown the next time the URL is requested. In other embodiments, this time-shifting technique may also be combined with the pattern-recognition technique and the approach to accelerating delivery of HTML snippet ads.

54 Claims, 5 Drawing Sheets

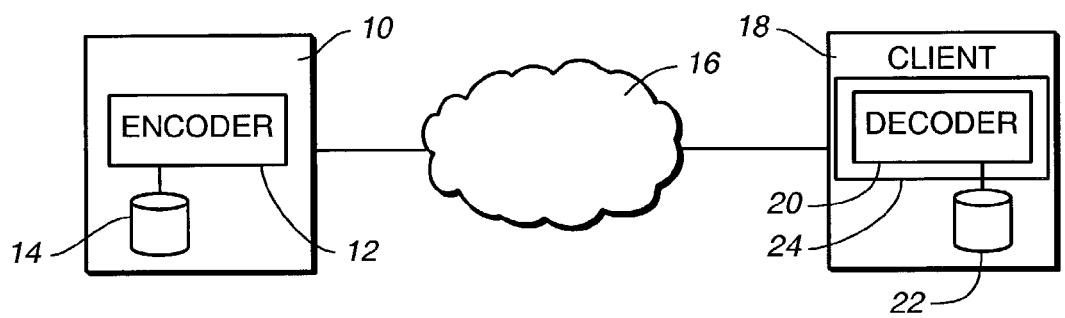
FIG._1

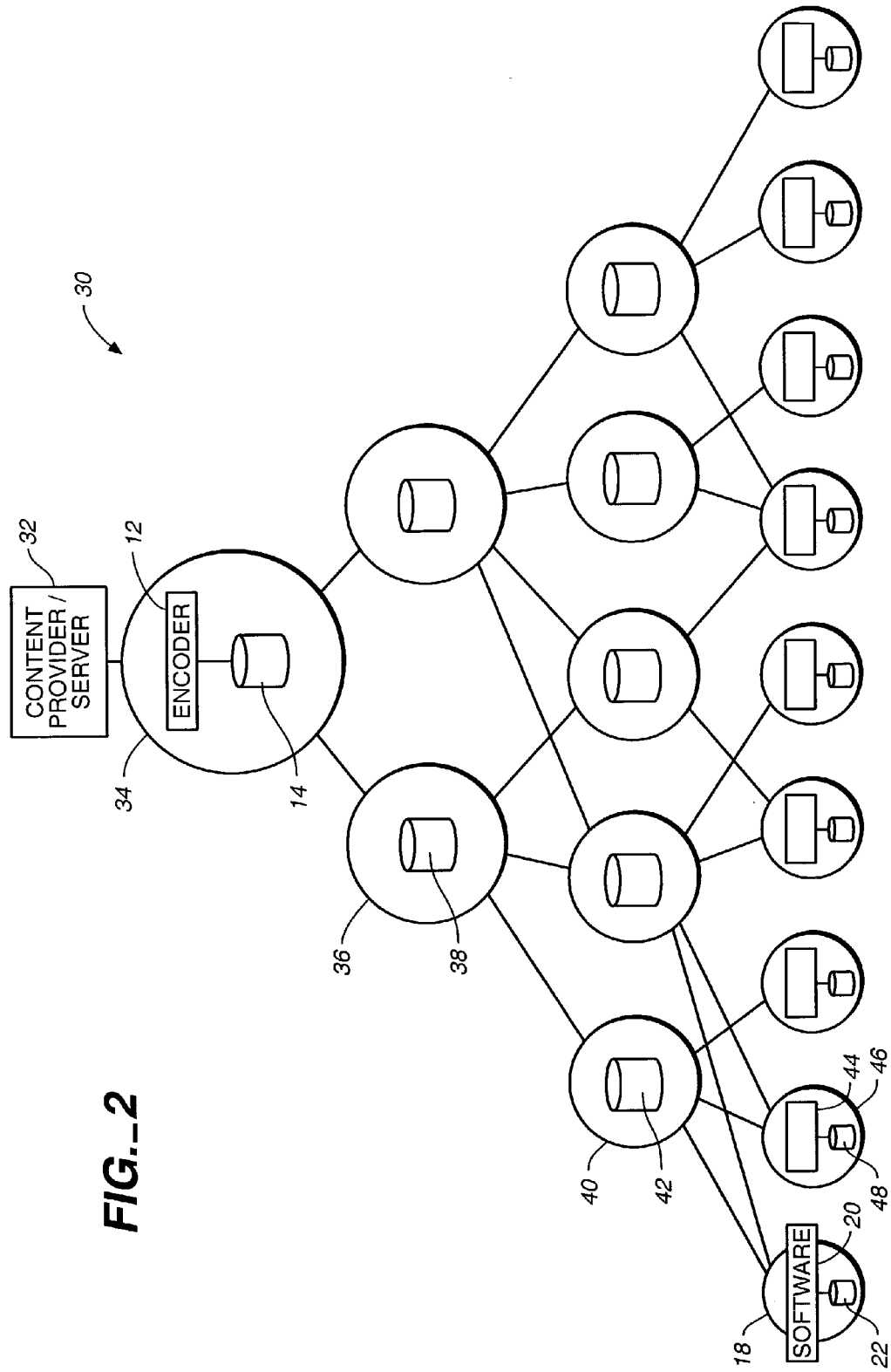
FIG._2

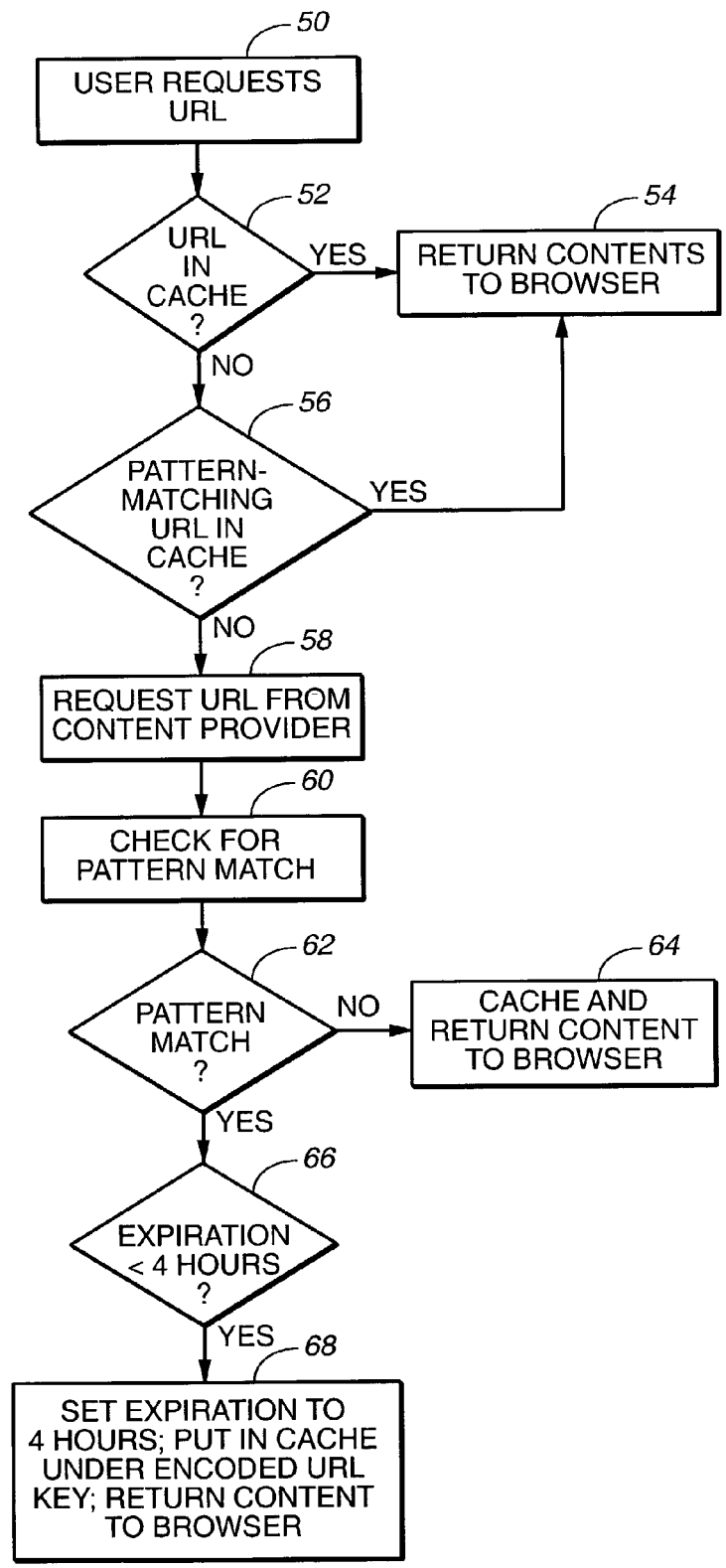
FIG._3

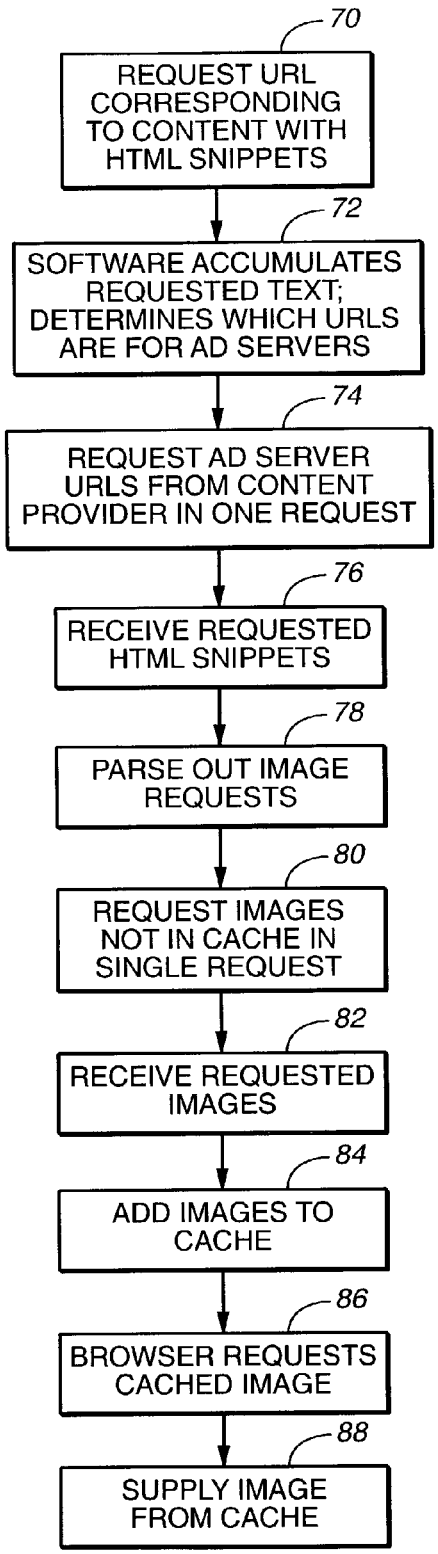
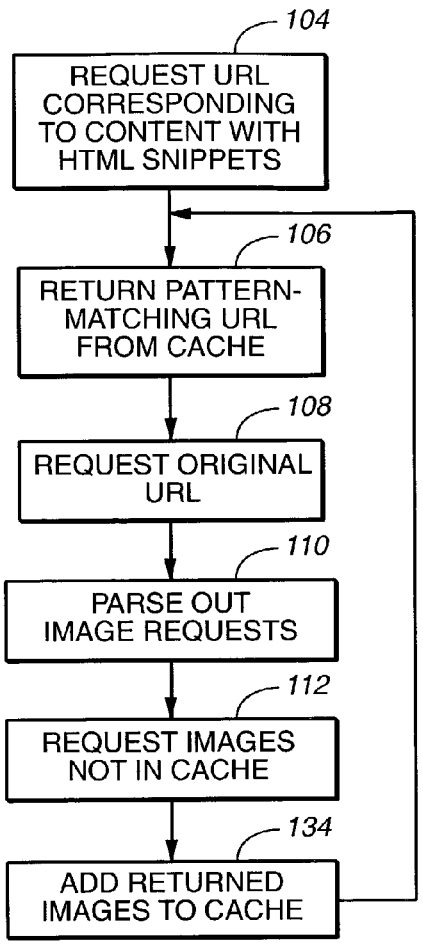
FIG._4
FIG._7

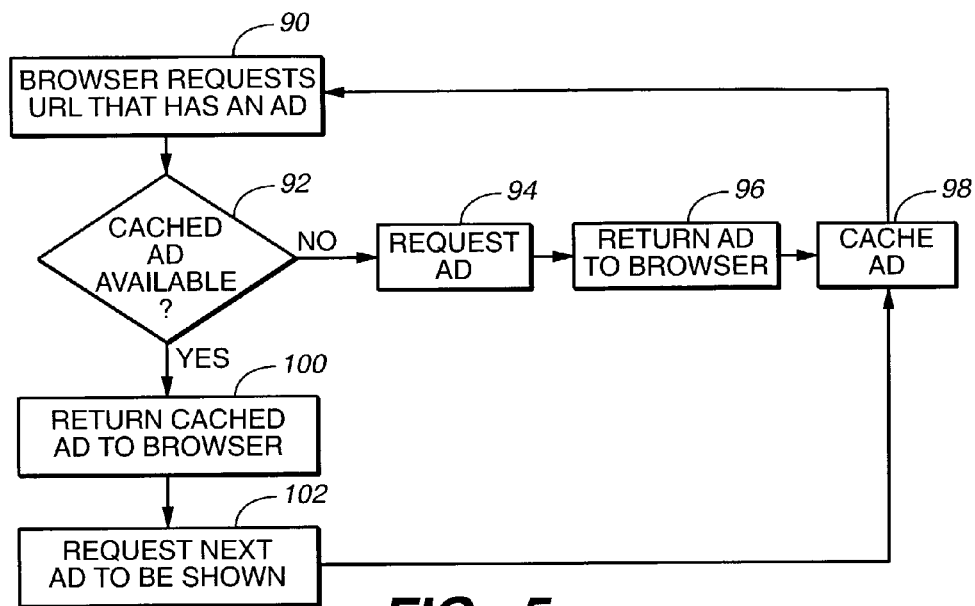
FIG._5
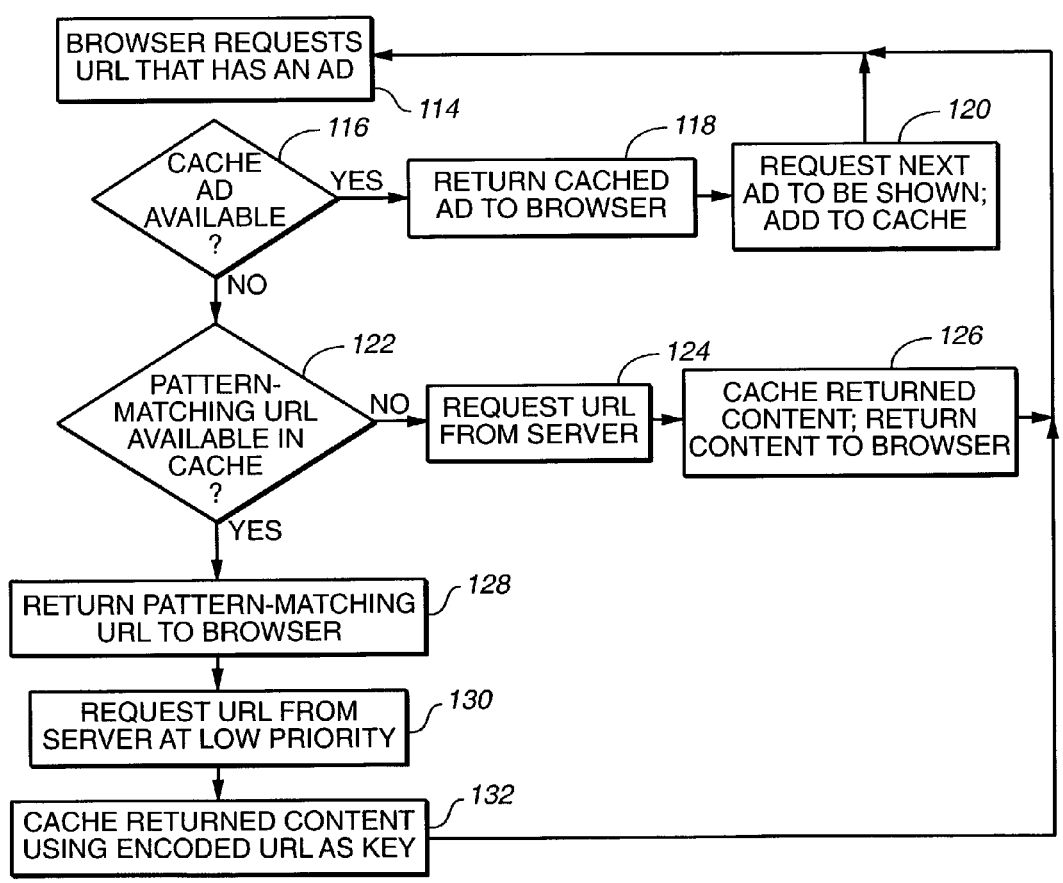
FIG._6

METHOD FOR ACCELERATING DELIVERY OF CONTENT IN A COMPUTER NETWORK

TECHNICAL FIELD

This invention is concerned with accelerating delivery of requested Web page content within a computer network.

BACKGROUND ART

With the growth of the Internet and e-commerce, an increasing number of Web sites feature third party advertising. One of the most common types of advertisements is the banner ad, a typically rectangular advertisement on a Web page which generally will link to the advertiser's Web site when a viewer clicks on the banner. Banner ads can contain any combination of text, graphic images, animated graphics, and sound.

Banner ads are produced by embedding HTML code for the ad in the HTML code for the "displaying" Web page. A Web browser downloading a Web page with a banner ad will execute the ad's embedded code and fetch any content required to display the ad on the downloaded Web page. Banner ad content may be stored on the same server hosting the displaying Web page or it may be stored on an ad server, which typically contains content for numerous ads which are delivered for display on Web pages in a sequence (for instance, ad A may be delivered the first time a URL is requested, ad B may be delivered the second time a URL is requested, etc.). Since banner ads often require content to be fetched from an ad server and may also contain content such as video that may take some time to download and execute, banner ads can increase the time required to fully render a requested Web page, a source of frustration to the viewer who requested the page. Another problem is that fetching content from an ad server, particularly when the content is contained in a large file, causes congestion and service latency in the network.

There are additional latency problems associated with fetching advertisements. One problem is that some Web sites use a variable URL, e.g. a URL with a numeric component, to refer to the same image. Even though the image associated with a variable URL may already be in the cache of a requesting client, if a viewer requests a Web page with an ad specified by a variable URL other than the URL stored in the client cache, the same image must be fetched again from the ad server. In addition, these sites also send the image with an instant timeout. This is inefficient and unnecessarily increases network congestion.

Some Web sites use HTML code that loads other HTML code, known as HTML snippets, that contains references to ad images. The use of HTML snippets to create banner ads also has at least one drawback. The problem is that the use of HTML snippets requires the browser to make additional requests to fetch the ad content to complete the Web page rather than issuing only one request to get all the information necessary to download the desired Web page. These additional requests increase network congestion, adding to network latency.

Various approaches have been employed to address these problems. Web page owners may limit the file size of banner ads in an attempt to improve download times, though arguably this reduces the effectiveness of the advertisements since it limits the type of content that is presented to the viewer. Other approaches include sending advertisements when the browser or computer is idle and presenting advertisements in another browser window while the viewer awaits completion of an Internet transaction such as linking to another page.

U.S. Pat. No. 5,740,549 "Information and Advertising Distribution System and Method" to Reilly et al. discloses a system in which content, including advertisements, is sent from a server to a client workstation at regular intervals. Advertisements are preferably sent at night or during long period of user inactivity because the advertising images generally are larger than, for instance, news items, which are generally text files; by sending the advertising content when the user is not using the computer, the content may be updated without compromising the user's active use of the computer. The files containing the advertisements are compressed using known compression techniques. The content is stored in the workstation's local memory and may be subsequently viewed by a workstation user.

U.S. Pat. No. 6,185,586 "Content Display During Idle Time as a User Waits for Information During an Internet Transaction" to Judson discloses a method of displaying "interstitial" material, i.e., displaying material to a viewer while that viewer is waiting for an Internet transaction to be completed. After a requested Web page is downloaded from a server to a client, the same server also transparently downloads an applet to the client, which caches the applet. This applet, which may display advertising when launched, is launched when the client links to a second Web page from the originally-downloaded Web page. While the second Web page is downloaded, the applet is launched and a "mini page," which may be an advertisement, is displayed to the viewer.

U.S. Pat. No. 6,314,451 "Ad Controller for Use in Implementing User-Transparent Network-Distributed Advertising and for Interstitially Displaying an Advertisement So Distributed" to Landsman et al. and U.S. Pat. No. 6,317,761 "Technique for Implementing Browser-Initiated User-Transparent Advertising and for Interstitially Displaying an Advertisement, so Distributed Through a Web Browser in Response to a User Click-Stream" to Landsman et al. disclose a method and system of displaying interstitial advertisements. An HTML tag is embedded in a Web page. This tag contains two components: the first component "politely" downloads (i.e., downloads at a time when the browser is otherwise idle, thus reducing interference with other communications applications) and instantiates a Java applet at the client browser while the second component specifies the address of an advertising management system. The applet transparently downloads advertising files from the advertising management system, thus "decoupling" advertising content from the displaying Web page. Advertising files downloaded from the advertising management system are displayed to the user on an interstitial basis in response to a user click stream which indicates the start of an "interstitial interval," such as when a user clicks on a link to another Web page.

None of the prior art discussed here discusses a solution for improving delivery of a Web page's ads during "live" browsing of the Web page. Additionally, the prior art mentioned above does not reduce the network congestion associated with fetching ad images corresponding to variable URLs and HTML snippets. Furthermore, the use of interstitial ads does not guarantee that the viewer will actually view the ad. A viewer may simply close the window of an interstitial ad without actually viewing the content of the window. It is more likely that a viewer will view and interact with an ad if it is featured on the same Web page the reviewer originally requested.

It is an object of this invention to decrease network congestion and latency associated with downloading Web pages containing advertisements during "live" browsing of the World Wide Web.

SUMMARY OF THE INVENTION

The invention provides a method for reducing network congestion and service latency associated with downloading Web pages containing advertisements. This method may be employed in a caching network in which data is recursively compressed into hash codes. In one embodiment, pattern recognition algorithms are employed to determine whether a request for a URL may be satisfied by the content associated with a URL which is contained in the client's cache; if there is a pattern match, the cached contents associated with the URL are delivered to the browser to satisfy the request. In another embodiment, images associated with HTML snippet ads are requested and cached by client software before they are requested by the browser downloading the Web page where the images will be displayed. In a third embodiment, latency is reduced by "time shifting," wherein a cached ad is displayed while client software requests and caches the ad originally requested ad, which will be shown the next time the URL is requested. In other embodiments, this time-shifting technique may also be combined with the pattern-recognition technique and the approach to accelerating delivery of HTML snippet ads.

BRIEF DESCRIPTION OF THE DRAWINGS

FIG. 1 is a block diagram showing an exemplary configuration of a computer network in accordance with the invention.

FIG. 2 is a plan of a computer network in accordance with the invention.

FIG. 3 is a flowchart illustrating an approach to accelerating delivery of ads by using pattern recognition in accordance with the invention.

FIG. 4 is a flowchart illustrating an approach to accelerating delivery of HTML snippet ads in accordance with the invention.

FIG. 5 is a flowchart illustrating an approach to accelerating delivery of ads by time-shifting the sequence of ads to be displayed in accordance with the invention.

FIG. 6 is a flowchart illustrating an approach to accelerating delivery of ads by combining the pattern recognition and time-shifting approaches described in FIGS. 3 and 5.

FIG. 7 is a flowchart illustrating an approach to accelerating delivery of ads by combining the HTML snippet and time-shifting approaches described in FIGS. 4 and 5.

DETAILED DESCRIPTION OF THE INVENTION

In the preferred embodiment of the invention, the communications network is a persistently-connected caching network featuring multiple hubs which are capable of caching material transmitted through the hub as the material is sent from either from a server or another caching hub in response to a client's request for the material. The network devices also employ a socket layer capable of combining multiple messages from different machines, threads, and/or processes into single TCP/IP packets to be relayed along message hubs in the persistent network. Due to the direct connection between dedicated socket pairs of network members, there is bi-directional asynchronous communication between the network members. Data communication may be further accelerated in this network by a data compression scheme in which requested data is recursively compressed into hash codes, or identifiers, by an encoder either at the content provider or at a proxy for the content provider; these hash codes are sent to the requesting client. A decoder at the requesting client has a cache of known hash codes and may request data corresponding to unknown codes from the encoder or caching hubs intermediating between the requester and encoder. This request-reply sequence is also recursive and continues until the decoder is able to decompress the requested data. The network and compression scheme are described in U.S. patent application Ser. No. 10/012,743, filed Dec. 7, 2001, and herein incorporated by reference. While the network and data compression schemes are part of the preferred embodiment, this invention may be employed in other caching networks that do not use the data compression scheme described above. In addition, although the following discussion focuses on the delivery of advertisements, this is not meant to preclude the methods of the invention being applied to accelerate the delivery of content other than ads.

A partial configuration of a preferred embodiment of the network in which the invention operates is shown in FIG. 1. A client 18, containing a Web browser 24, decoding software ("decoder") 20, and a hash code database 22 which contains content associated with hash codes, and a server, or content provider, 10, containing encoding software ("encoder") 12 and a hash code database 14, are each connected to a network 16. The encoder 12 can be integrated into the server's operating system, Web server, or may be a proxy Web server. The decoder 20 can be integrated into the client's 18 operating system or a Web browser 24.

A block diagram of a preferred embodiment's entire persistently-connected network 30 is shown in FIG. 2. A server or content provider 32 is connected to a proxy server 34 which is running an encoder 12 and contains a hash code database 14. The proxy server 34 is connected to another network hub 36 which contains a hash code database 38 which is in turn connected to another hub 40 which also contains a hash code database 42. Hub 40 is connected to multiple devices acting as clients, including client 18, which is running decoding software 20 and has a hash code database 22, and another client 46, which also contains decoding software 44 and a hash code database 48. As will be shown in greater detail below, the decoding software 20, 44 is also capable of performing tasks in addition to decoding replies sent by the encoder including encoding URLs, rewriting requests for data, and determining routing in the network.

For instance, suppose client 18 issues a request for information from content provider 32, which is a member of the persistent network 30. The content provider 32 replies to the request and the reply is relayed through hubs 34, 36, and 40 before reaching the client 18. As the reply is relayed through the hubs 34, 36, and 40, the reply is cached in their databases 14, 38, and 42 (which are similar to the hash code databases described above). Now client 46 makes a request of for the same Web page as the first client 18. The software 44 running at client 46 determines the route to the content provider 32 and queries each hub 40, 36, and 34 en route to see if the databases 42, 38, and 14 contain any data needed for the reply.

This lookup can be achieved, for instance, by encoding the URL with the software 44 and checking the database 48 associated with the client's software 44 to see if that particular URL has been requested before. If it has, the static portion of the request is immediately available from the client's 46 database 48. Updated content may be obtained from the content provider 32 or some other member of the network 30. In this instance, the client software 44 can determine the route to the content provider 32 and while the request is traveling along the way to content provider 32 query the intervening hubs 40, 36, and 34 to see if those hubs contain the remaining requested content. In this example, database 42 at hub 40 may contain the remaining content required by client 46 since it cached the reply sent to client 18. In this case, the request is rewritten by software 44 and sent to hub 40. (If client 46 database 48 does not contain static content to be used in the reply to the request, the software 44 queries the hubs' 40, 36, and 34 databases 42, 38, and 14 to see if the information for the reply is stored there.) Content provider 32 is only queried if the intervening hubs 40, 36, and 34 cannot satisfy the client's request.

With respect to FIG. 3, the invention's approach to accelerating repetitive ads by using pattern matching or recognition to detect cached, related URLs is described. As noted above, URLs may be encoded by client software into hash codes. Standard pattern recognition algorithms may be used to determine if the hash code of one URL matches the pattern of another URL, indicating that the content associated with these URLs is related. By determining whether a requested URL matches the pattern of another URL which, along with the content associated with the URL, is contained in the client cache, network congestion and latency may be reduced by delivering the cached material to the client's browser rather than requesting material from an ad server. (Although the URL is encoded in the preferred embodiment, this encoding is not required in other embodiments.)

In FIG. 3, a viewer requests a Web page by entering the URL for that page into a browser (block 50). The Web site contains embedded code for an ad that requires that content at a site designated by a variable URL be fetched in order to display the page. The client's cache is checked to determine whether the content associated with the URL in contained in the cache (block 52). If it is, the content is returned to the client's browser (block 54). If the URL is not contained in the cache, the cache is checked to see whether a pattern-matching URL is contained in the cache (block 56). If a pattern-matching URL is in the cache, the content is returned to the client's browser (block 54). If there is no pattern-matching URL in the cache, the URL is requested from the content provider (the caches of any hubs intermediating between the client and the content provider are also checked to determine whether these have the requested URL) (block 58).

Once the requested URL is returned, pattern-matching algorithms are run again to determine whether there is a pattern match with other URLs contained in the cache (block 60). If there is no pattern match (block 62), the content is cached and returned to the browser (block 64). If there is a pattern match (block 62), the expiration time specified in the message header is checked. If the expiration time is more than four hours, the content is cached (with the encoded URL as the key) and returned to the browser (block 64). If the expiration time is less than four hours (block 66), the expiration is set to four hours, the content is cached with the encoded URL as the key, and the content is returned to the browser (block 68). Extending the expiration time to four hours increases the likelihood that cached material may be used to respond to another request for the URL rather than having to fetch new material from the ad server.

The delivery of HTML snippet ads is accelerated as shown in FIG. 4 by using pattern-matching algorithms which are created manually on a case-by-case, or by-domain, basis after examining requested URLs. When a user requests a URL that corresponds to content with HTML snippets (block 70), the client software accumulates the requested text and determines, via the pattern-matching algorithm described above, which URLs correspond to ad servers (block 72). The requests for URLs associated with ad servers are combined into one request and sent to the content provider (block 74). When the requested HTML snippets are received at the client (block 76), image requests are parsed out (block 78). The client's cache is checked to determine which if any images are contained in the cache and a single request for those images not contained in the cache is sent to the ad server (block 80). When the requested images are received (block 82), the images are added to the cache (block 84). When the browser requests the cached image (block 86), it is supplied from the cache (block 88). This approach puts potentially requested images in the client's cache before they are requested, thus reducing latency in displaying a requested Web page.

Advertisements may also be "time-shifted" to reduce latency and network congestion. Time-shifting requires that ads be displayed on a Web page in a slightly different sequence than originally intended. With regard to FIG. 5, when a browser issues a request for a Web page that has an ad (block 90), the client cache is checked to see if the ad is contained in the cache (block 92). If the ad is cached (block 92), the cached ad is returned to the browser (block 100). The next ad to be shown is then requested (block 102) and cached (block 98) and is available to be sent to the browser the next time the user requests the Web page (block 90). If there is no cached ad available (block 92), the ad is requested (block 94) and returned to the browser (block 96). The ad is also added to the client's cache with the encoded URL as the key (block 98). The next time the user requests the Web page (block 90), an ad for the Web page is in the cache (block 92) and may be returned to the browser (block 100).

As shown in FIG. 6, the URL pattern recognition technique described in FIG. 3 may be combined with the time-shifting technique described in FIG. 5. Referring to FIG. 6, when the user requests a URL that has an ad (block 114), the cache is checked to see if a cached ad is available (block 116). If a cached ad is available (block 116), the cached ad is returned to the browser (block 118). The next ad to be shown is requested and, when returned, is added to the cache with the encoded URL as the key (block 120), ready to be shown the next time the user requests the URL (block 114).

If a cached ad is not available (block 116), a check is made to see whether a pattern-matching URL is available in the cache (block 122). If no pattern-matching URL is available (block 122), the URL is requested from the server (block 124). The returned content is cached and returned to the browser (block 126). The cached ad is then available to be returned again to the browser the next time the user requests the URL (block 114).

If a pattern-matching URL is available in the cache (block 122), the pattern-matching URL is returned to the browser (block 128). The requested URL is then obtained from the server; this request is given low priority relative to other Web page requests because the content is not required immediately (block 130). The returned content is cached using a pattern-matching URL as the index of the cache (block 132). The cached content is then available to be returned to the browser the next time the URL is requested (block 114).

With regard to FIG. 7, the time-shifting technique discussed in FIG. 5 may also be combined with the HTML snippet technique discussed in FIG. 4. As shown in FIG. 7, when a URL that corresponds to content with HTML snippets is requested (block 104), and a pattern-matching URL is available in the cache, the pattern-matching URL is returned to the client (block 106). As discussed above in FIG. 4, pattern-matching algorithms are manually determined on a by-domain basis. The originally-requested URL is then requested from the server (block 108), the image requests from the returned content are parsed out (block 110), and the images not in the cache are requested (block 112) and cached (block 132) so they will available to be sent to the browser the next time the URL or a pattern-matching URL is requested (block 104).

The invention claimed is:

1. In a communications network, a method for accelerating delivery of data comprising:
   a) receiving a request for data from a client's Web browser at client network software associated with a first cache containing data sent to the client, said request directed to a data source in the communications network, wherein the data source is a content provider, a content provider proxy, or a network hub intermediating between the first proxy and the con-tent provider, the hub having a second cache containing data transmitted from the content provider through the hub;
   b) determining whether content corresponding to the requested URL is already in the first cache and, if so
      i) returning the content to the client's browser; otherwise
      ii) determining whether the requested URL matches a pattern of other URLs in the first cache and, if so
         A) returning content corresponding to a pattern-matching URL to the client's browser; otherwise
         B) requesting the data from the data source, said request sent from the client network software;
         C) receiving requested data from the data source at the client network software;
         D) determining whether a URL corresponding to the requested data matches a pattern of other URLs stored in the first cache and determining whether the URL which matches the pattern of other URLs stored in the first cache has an expiration time which less than a predetermined period of expiration time, said determination of expiration time performed prior to returning the requested data to the client's browser; and
         E) returning the requested data to the client's browser if the corresponding URL does not match the pattern of other URLs stored in the first cache, otherwise adding the content corresponding to the URL to the first cache before returning the requested data to the client's browser.

2. The method of claim 1 further comprising setting the expiration time of the URL to equal the predetermined expiration time, said setting performed prior to returning the requested data to the client's browser.

3. The method of claim 1 wherein the communications network is a private persistent network having a plurality of hubs, each hub connected to another hub by a dedicated socket connection, wherein there is bi-directional asynchronous communication between dedicated pairs of network hubs, each hub having means for caching data transmitted through the hub at a database of the hub.

4. The method of claim 3 wherein the client and the data source are hubs in the private persistent network.

5. The method of claim 4 wherein the data source is also a member of a public global communications network.

6. The method of claim 4 wherein the client is also a member of a public global communications network.

7. The method of claim 1 wherein the communications network is a public global communications network.

8. The method of claim 1 further comprising compressing the requested data at the data source with an encoder, said compressing consisting of representing runs of data with at least one identifier, wherein the encoder is software installed at the data source.

9. The method of claim 8 further comprising decompressing compressed requested data with the client network software.

10. The method of claim 1 wherein the requested data is an advertisement.

11. The method of claim 1 wherein the URL corresponding to requested data is compressed by the client network software, said compression consisting of representing runs of data with at least one identifier.

12. The method of claim 1 further comprising caching content in the first cache using a corresponding compressed URL as a key.

13. The method of claim 1 wherein a standard pattern-matching algorithm is used to determine whether the requested URL matches a pattern of other URLs in the first cache.

14. In a communications network, a method for accelerating delivery of data comprising:
   a) receiving a first request for a first set of data from a client's Web browser at client network software associated with a first cache containing data sent to the client, said request directed to a first data source in the communications network, wherein the data source is a content provider, a content provider proxy, or a network hub intermediating between the first proxy and the content provider, the hub having a second cache containing data transmitted from the content provider through the hub;
   b) requesting the first set of data from the first data source, said request sent from the client network software;
   c) receiving requested first set of data from the first data source at the client: network software;
   d) determining which URLs in the first set of data correspond to a second data source, wherein the second data source is a second content provider, a second content provider proxy, or a second network hub intermediating between the first proxy and the second content provider, the hub having a third cache containing data transmitted from the second content provider through the hub, wherein the determination of which URLs in the first set of data correspond to the second data source is made by a pattern-matching algorithm which is created manually on a by-domain basis after examining the requested URL;
   e) combining all requests for a second set of data from the second data source in a second request;
   f) sending said second request to the second data source;
   g) receiving the requested second set data from the second data source at the client network software;
   h) parsing out requests for images contained in the second set of requested data;
   i) determining whether requested images are contained in the first cache;
   j) combining all requests for images not contained in the first cache in a third request;
   k) sending said third request to the second data source;

l) receiving requested images from the second data source at the client network software; and m) adding requested images to the first cache, wherein an image requested by the client's browser is supplied by the first cache.

15. The method of claim 14 wherein the second set of data includes HTML snippets.

16. The method of claim 14 wherein the second set of data includes advertisements.

17. The method of claim 14 wherein the communications network is a private persistent network having a plurality of hubs, each hub connected to another hub by a dedicated socket connection, wherein there is bi-directional asynchronous communication between dedicated pairs of network hubs, each hub having means for caching data transmitted through the hub at a database of the hub.

18. The method of claim 17 wherein the client, first data source, and second data source are hubs in the private persistent network.

19. The method of claim 18 wherein the first data source is also a member of a public global communications network.

20. The method of claim 18 wherein the second data source is also a member of a public global communications network.

21. The method of claim 18 wherein the client is also a member of a public global communications network.

22. The method of claim 14 wherein the communications network is a public global communications network.

23. The method of claim 14 further comprising compressing the requested data at the first data source with an encoder, said compressing consisting of representing runs of data with at least one identifier, wherein the encoder is software installed at the first data source.

24. The method of claim 23 further comprising decompressing compressed requested data with the client network software.

25. The method of claim 14 further comprising compressing the requested data at the second data source with an encoder, said compressing consisting of representing runs of data with at least one identifier, wherein the encoder is software installed at the second data source.

26. The method of claim 25 further comprising decompressing compressed requested data with the client network software.

27. The method of claim 14 wherein the URL corresponding to requested data is compressed by the client network software, said compression consisting of representing runs of data with at least one identifier.

28. The method of claim 14 further comprising adding content to the first cache using a corresponding compressed URL as a key.

29. In a communications network, a method for accelerating delivery of data comprising:
   a) receiving a request for a first set of data from a client's Web browser at client network software associated with a first cache containing data sent to the client, wherein the first set of data is a member of a group having sets of data that are serially presented, and wherein the data source is a content provider, a content provider proxy, or a network hub intermediating between the client and the content provider, the hub having a second cache containing data transmitted from the content provider through the hub;
   b) determining whether the first set of data is contained in the first cache, and if so i) returning the cached set of data to the client's browser, requesting a second set of data from the data source, wherein the second set of data is also a member of the group having sets of data that are serially presented, and wherein the second set of data is to be shown subsequent to the first set of data, receiving the second set of data at the client network software, and caching the second set of data in the first cache; otherwise
   ii) determining whether a URL corresponding to the request for the first set of data matches a pattern of other URLs stored in the first cache wherein a standard pattern-matching algorithm is used to determine whether the URL corresponding to the request for the first set of data matches a pattern of other URLs stored in the first cache, and further determining whether the URL which matches the pattern of other URLs stored in the first cache has an expiration time which is less than a predetermined period of expiration time, said determination of expiration time performed prior to returning the requested data to the client's browser, and if so
   A) returning data corresponding to the pattern-matching URL to the client's browser, requesting the first set of data from the data source, receiving the first set: of data at client network software, and caching the first set of data in the first cache: otherwise
   B) requesting the first set of data from the data source, receiving the first set of data at the client network software, returning the first set of data to the client's browser, and caching the first set of data in the first cache.

30. The method of claim 29 further comprising sending the request for the first set of data from the client network software to the data source at a low priority.

31. The method of claim 29 wherein the communications network is a private persistent network having a plurality of hubs, each hub connected to another hub by a dedicated socket connection, wherein there is bi-directional asynchronous communication between dedicated pairs of network hubs, each hub having means for caching data transmitted through the hub at a database of the hub.

32. The method of claim 29 wherein the client and data source are hubs in the private persistent network.

33. The method of claim 32 wherein the data source is also a member of a public global communications network.

34. The method of claim 32 wherein the client is also a member of a public global communications network.

35. The method of claim 29 wherein the communications network is a public global communications network.

36. The method of claim 29 further comprising compressing the requested data at the data source with an encoder, said compressing consisting of representing runs of data with at least one identifier, wherein the encoder is software installed at the data source.

37. The method of claim 36 further comprising decompressing compressed requested data with the client network software.

38. The method of claim 29 wherein the first set of data is an advertisement.

39. The method of claim 29 wherein the URL corresponding to requested data is compressed by the client network software, said compression consisting of representing runs of data with at least one identifier.

40. The method of claim 29 further comprising content in the first cache using the corresponding compressed URL as a key.

41. In a communications network, a method for accelerating delivery of data comprising:
   a) receiving a first request for a first set of data from a client's Web browser at client network software associated with a first cache containing data transmitted to the client, wherein the first data source is a content provider, a content provider proxy, or a network hub intermediating between the client and the content provider, the hub having a second cache containing data transmitted from the content provider through the hub;
   b) returning a second set of data to the clients browser, wherein a first URL corresponding to the second set of data matches a pattern of a second URL corresponding to the first request, said second set of data stored in first cache, wherein a pattern matching algorithm is created manually on a by-domain basis after examining the requested URL, the manually-created pattern-matching algorithm is used to determined whether the first URL corresponding to the second set of data matches the pattern of the second URL, the first URL having an expiration time which is less than a predetermined period of expiration time;
   c) requesting the first set of data from the first data source, said request sent from the client network software;
   d) receiving the requested first set of data from the first data source;
   e) parsing out requests for images contained in the first set of data;
   f) determining whether requested images are contained in the first cache;
   g) combining all requests for images not contained in the first cache in a second request;
   h) sending said second request to a second data source, wherein the second data source is a second content provider, a second content provider proxy, or a second network hub intermediating between the client and the second content provider, the second hub having third cache containing data transmitted from the second content provider through the second hub;
   i) receiving requested images from the second data source; and
   j) adding requested images to the first cache, wherein an image requested by the client's browser is supplied by the first cache.

42. The method of claim 41 wherein the communications network is a private persistent network having a plurality of hubs, each hub connected to another hub by a dedicated socket connection, wherein there is bi-directional asynchronous communication between dedicated pairs of network hubs, each hub having means for caching data transmitted through the hub at a database of the hub.

43. The method of claim 42 wherein the client, first data source, and second data source are hubs in the private persistent network.

44. The method of claim 43 wherein the first data source is also a member of a public global communications network.

45. The method of claim 43 wherein the second data source is also a member of a public global communications network.

46. The method of claim 43 wherein the client is also a member of a public global communications network.

47. The method of claim 41 wherein the communications network is a public global communications network.

48. The method of claim 41 further comprising compressing the requested data at the first data source with an encoder, said compressing consisting of representing runs of data with at least one identifier, wherein the encoder is software installed at the first data source.

49. The method of claim 48 further comprising decompressing compressed requested data with client network software.

50. The method of claim 41 further comprising compressing the requested data at the second data source with an encoder, said compressing consisting of representing runs of data with at least one identifier, wherein the encoder is software installed at the second data source.

51. The method of claim 50 further comprising decompressing compressed requested data with client network software.

52. The method of claim 41 wherein the sets of data are advertisements.

53. The method of claim 41 wherein a URL corresponding to a requested set of data is compressed by the client network software, said compression consisting of representing runs of data with at least one identifier.

54. The method of claim 41 further comprising caching content in the first cache using the corresponding compressed URL as a key.

* * * * *